Oct. 24, 1933.      J. E. LODGE      1,931,872
APPARATUS FOR HANDLING MATERIAL
Filed March 12, 1931
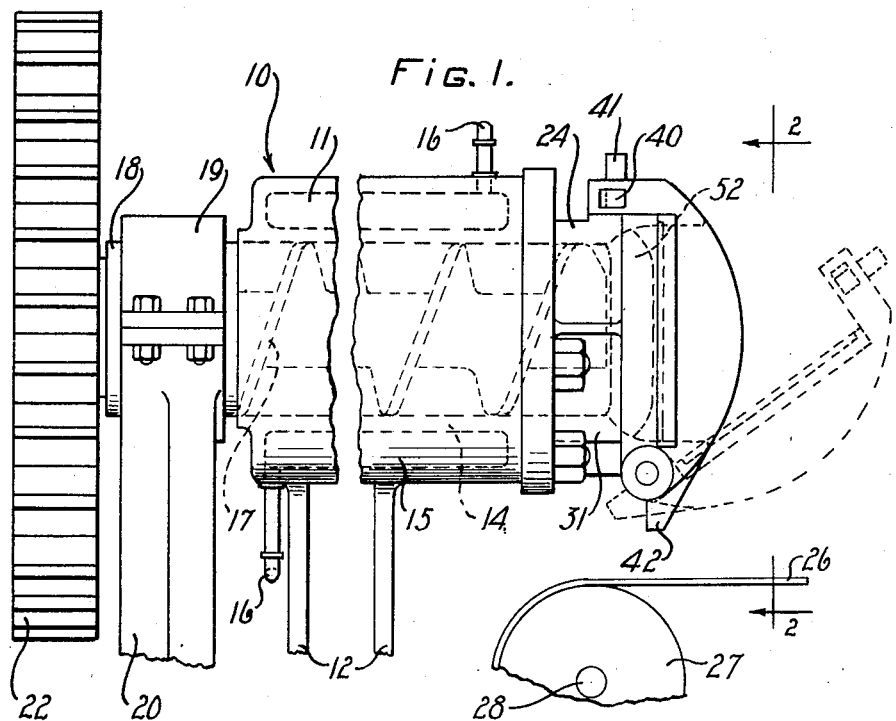
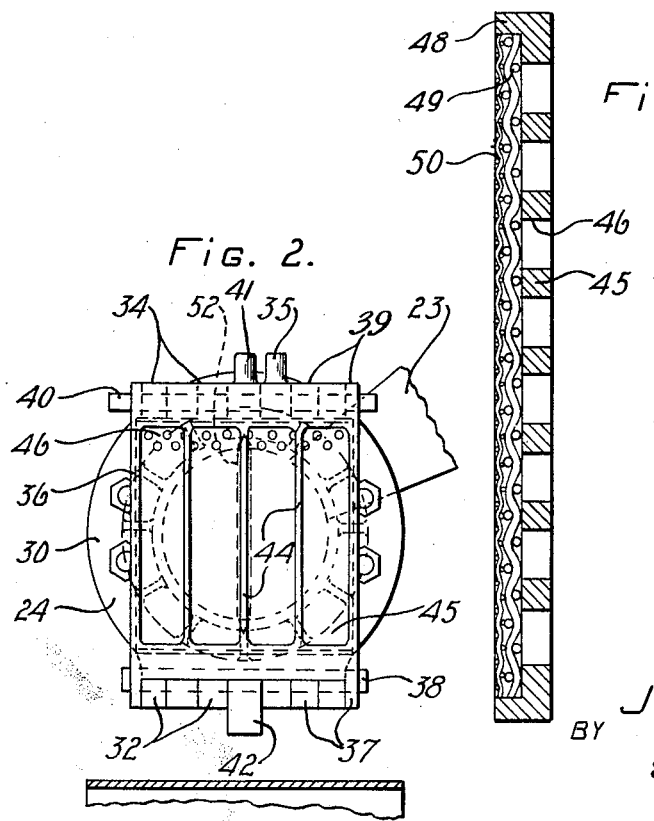
INVENTOR
J. E. LODGE
BY
E. R. Nowlan
ATTORNEY Patented Oct. 24, 1933

1,931,872

UNITED STATES PATENT OFFICE

1,931,872

APPARATUS FOR HANDLING MATERIAL

Joseph E. Lodge, Baltimore, Md., assignor to Western Electric Company, Incorporated, New York, N. Y., a corporation of New York Application March 12, 1931. Serial No. 521,965

2 Claims. (Cl. 146—174)

This invention relates to an apparatus for handling material and more particularly to an apparatus for handling plastic material.

In the manufacture of rubber insulated wire the ingredients of the insulating compound are mixed and reduced to a plastic mass of finely comminuted particles which is cleaned and deposited upon the wire as an insulated covering. Suitable cleaning of the material is facilitated by passing it through a strainer.

An object of the invention is to provide an apparatus for handling material which will be compact, simple and efficient.

One embodiment of the invention contemplates the provision, in an extruding machine, of a hinged straining head in which is held a compound strainer composed of contiguous wire screens and a perforated plate. The strainer may be cleaned by unlocking the head and discarding one of the screens bearing accumulated débris.

The invention will be more clearly understood by referring to the following detailed description, read in conjunction with the accompanying drawing forming a part thereof, in which Fig. 1 shows a fragmentary side elevation of an extruding machine with a straining head mounted thereon;

Fig. 2 shows a fragmentary section taken on the line 2—2 of Fig. 1, and

Fig. 3 shows an enlarged detailed sectional view of a compound strainer used in the straining head.

Referring to the drawing wherein similar parts are indicated by identical reference numerals, an extruding apparatus, generally designated by the numeral 10, is pivotally mounted upon any suitable base (not shown) and includes a cylinder or shell 11 mounted upon a pair of leg supports 12—12. The cylinder is provided with an interior wall 14 spaced from the outer wall thereof, the area therebetween constituting a water jacket 15 for controlling the temperature of the interior of the cylinder. Inlet and outlet pipes 16—16 are provided for furnishing, when desired, a continuous flow of water through the jacket. A worm 17 extends axially through the cylinder and is provided at the left hand end thereof, as shown in Fig. 1, with a projecting shaft portion 18 which is rotatably disposed in any suitable type of bearing 19 having a rigid support 20. A gear 22 is suitably secured upon the end of the shaft portion 18 and may be connected to any suitable source of power (not shown) for rotating the worm 17. At one side of the cylinder (Fig. 2) a hopper 23 is provided which communicates with the interior of the cylinder and constitutes means whereby material to be treated therein may be supplied, preferably under pressure. At the right hand end of the cylinder, as shown in Figs. 1 and 2, a strainer head is secured, details of which will be explained.

An endless or belt conveyor 26, of any suitable type, is positioned beneath the strainer head 24 upon a pulley 27 which is rotatable about a horizontally disposed shaft 28. The strainer head 24 consists of a circular plate 30 which is bolted or otherwise suitably secured to the right hand end of the cylinder and is formed with a rectangular flange 31. The flange is provided along the lower edge thereof with a plurality of spaced projecting perforated lugs 32, 32 and at the top edge thereof with spaced projecting perforated lugs 34, 34. Integrally formed therewith is also an upwardly projecting pin 35. A rectangular frame 36, having a plurality of perforated lugs 37 at the bottom thereof which are suitably spaced in alternation with the lugs 32 of the flange 31, is pivotally mounted on the flange, the lugs 32 fitting respectively between the lugs 37 so as to provide a strong connection, yet without hindering pivotal movement of the frame 36 about a pin 38 which is passed through all of the lugs 32 and 37. The frame is provided with a plurality of perforated lugs 39, 39 at the top thereof which are spaced in alternate relation to the lugs 34 of the flange. When the plate is closed, as shown in full lines in Figs. 1 and 2, the lugs 34 fit between the respective lugs 39, 39 the plate being locked when in such position by means of a tapered pin 40 which may be inserted from the right hand side as shown in Fig. 2 through all of the lugs 34 and 39. One of the lugs 39 adjacent the pin 35 is provided with a similar pin 41. The frame is provided with a projecting ledge 42 at the bottom thereof for the purpose of engaging the lower surface of the flange 31 when the frame 36 is unlocked to maintain said frame in a horizontal position, as suggested by the dotted line showing in Fig. 1, which indicates the frame in the course of being lowered to the horizontal position.

The upper and lower edges of the rectangular frame 36 are connected by a plurality of vertically extending outwardly curved ribs or bars 44, 44, in the particular embodiment five such being shown, for the purpose of strengthening the assembly against large pressures which may be developed against the straining head. For use in the head a compound strainer is provided consisting of a rectangular plate 45 which is perforated throughout its major cross section as shown at points 46, 46, the size of the perforations being such as to form material pressed through the plate to a stringy mass. The rectangular plate 45 is provided with a projecting peripheral rim forming a recess in which is placed contiguous to the perforated area of the plate a strong relatively coarse screen 49. A finer screen 50 of a mesh suitable to thoroughly clean material to be passed therethrough reposes in the recess contiguous to the coarser screen. In practice it will be understood that the width of the flange, perforated plate and rectangular frame are identical, and that the dimension of the screens 49 and 50 are but slightly less in order to permit their being received snugly in the recess of the perforated plate as shown in Fig. 3. A thin fin 52 is formed integrally with the circular plate 30 at a point between the end of the worm 17 and the fine screen 50 for the purpose of restraining rotary motion of material being extruded through the screen.

In operation of the above, plastic material to be extruded passes down the hopper 23 and into the cylinder at the inner end thereof. By rotating the worm in a counter-clockwise direction the spiral portion thereof continually engages the material and advances it toward the straining head. In setting up the machine for operation, the compound strainer is assembled as shown in Fig. 3, the wire screens 49 and 50 being placed side by side in the recess of the perforated plate, the heavier screen being placed contiguous to the perforated area thereof. As thus assembled, the strainer is placed against the rectangular flange 31 and the frame 36 is pivoted into vertical position and the tapered pin 40 is thrust through the upper lugs 34 and 39 to clamp the screens against the stationary fin 52. In cases where the material being extruded is being worked at temperatures higher than the room temperature, it is preferable to heat the strainer before placing it in the frame. As the extrusion proceeds the material is forced through the strainer, the fine screen separating solid particles of refuse, metal, etc. The coarse strong mesh 49 supports the fine screen, preventing the tearing thereof due to the pressure of the worm, and permits the strained material to pass therethrough and beyond the perforated plate. The material issues between the vertical bars 44, 44 and is deposited upon the conveyor 26 which, moving the direction indicated (Fig. 1), may be operated in any suitable manner to carry the material away. After the flow of material has fallen to a low rate on account of the accumulation of foreign matter, the machine is stopped, the tapered pin 40 is knocked out and the rectangular frame 36 is pried open by placing a suitable bar between the upper pins 35 and 41 and twisting. The perforated plate is also pried away from its seat, after which the mass of compound may be cut through in any suitable manner, as by sawing back and forth with a piece of wire drawn tautly across the back of the plate.

The plate is then permitted to fall to a horizontal position on the frame 36 which is held horizontal by the projection 42, and the fine meshed screen 50 is removed, the dirt being removed therewith. A new screen 50 may then be put in position and the operation resumed or another perforated plate previously fitted with a coarse and a fine screen may be applied with even less delay. By providing the demountable compound strainer described above, it is possible to remove and replace screens in a few seconds, thus cutting down the time loss for cleaning quite materially. Furthermore, it will be observed that but a small quantity of rubber compound need be scrapped because that remaining in the machine is not disturbed when a dirt filled screen 50 is discarded.

Although the apparatus disclosed above has been described in connection with the extrusion of rubber insulating compounds, it is thought to be clear that it is susceptible of many other uses and of considerable modification without departing from the spirit of the invention and that the invention is not intended to be limited other than by the scope of the appended claims.

What is claimed is:

1. In an apparatus for extruding material, a cylinder for accommodating the material, a strainer head comprising an end plate and a rectangular frame pivotally connected at one end thereof to said end plate and provided at its opposite end with a pin locking mechanism extending the entire width of said frame, a perforated plate in said frame, a coarse screen in said perforated plate, a finer screen contiguous to said coarse screen in said perforated plate, and a fin integral with said end plate adapted to hold said perforated plate and screens in rigid position when said frame is in locked position.

2. In an apparatus for extruding material, a cylinder for accommodating the material, a head plate connected to said cylinder, a frame pivotally connected to said head plate, a perforated plate in said frame, a cleaning screen carried by said perforated plate, a second screen contiguous to said cleaning screen, and a fin carried by said head plate for restraining rotary motion of the material being extruded, said fin forming with said pivoted frame a clamping means for said perforated plate and said screens.

JOSEPH E. LODGE.